United States Patent
Suzuki et al.

(10) Patent No.: US 8,092,335 B2
(45) Date of Patent: Jan. 10, 2012

(54) DIFFERENTIAL FOR VEHICLE

(75) Inventors: Masashi Suzuki, Kariya (JP); Shinichiro Nakajima, Niiza (JP); Hiroshi Takuno, Nukata-gun (JP)

(73) Assignee: Jtekt Corporation, Osaka-shi (JP)

( * ) Notice: Subject to any disclaimer, the term of this patent is extended or adjusted under 35 U.S.C. 154(b) by 964 days.

(21) Appl. No.: 12/031,370

(22) Filed: Feb. 14, 2008

(65) Prior Publication Data
US 2008/0194373 A1 Aug. 14, 2008

(30) Foreign Application Priority Data

Feb. 14, 2007 (JP) ................................. 2007-033697
Apr. 13, 2007 (JP) ................................. 2007-106358

(51) Int. Cl.
*F16H 48/06* (2006.01)
(52) U.S. Cl. ...................................................... 475/230
(58) Field of Classification Search .................. 475/230, 475/231, 336
See application file for complete search history.

(56) References Cited

U.S. PATENT DOCUMENTS

| 1,446,545 A | 2/1923 | Brush et al. |
| 4,305,313 A | 12/1981 | Konkle |

FOREIGN PATENT DOCUMENTS

| JP | 57-90948 | 6/1981 |
| JP | 2520728 | 10/1996 |

OTHER PUBLICATIONS

U.S. Appl. No. 12/262,688, filed Oct. 31, 2008, Nakajima.
U.S. Appl. No. 12/534,399, filed Aug. 3, 2009, Nakajima, et al.
Extended European Search Report issued Sep. 6, 2010, in Application No. 08151453.1-1254 / 1959164.

*Primary Examiner* — David D Le
*Assistant Examiner* — Erin D Bishop
(74) *Attorney, Agent, or Firm* — Oblon, Spivak, McClelland, Maier & Neustadt, L.L.P.

(57) ABSTRACT

A differential (1) for a vehicle includes a differential case (2), side gears (5L, 5R) rotatably accommodated in the differential case (2), pinion gears (3, 4) engaged with the side gears (5L, 5R), and pinion gear shaft (50) inserted through the pinion gears (3, 4) to be supported by the differential case (2), in which the differential case (2) has pinion gear supporting portions (10, 11) for rotatably supporting the pinion gears (3, 4), respectively, the pinion gear shaft (50) has pinion gear supporting surfaces (50A, 50B) for rotatably supporting the pinion gears (3, 4), respectively, and the pinion gear supporting surfaces (50A, 50B) are disposed on a side of an axis line of rotation of the differential case (2) with respect to the pinion gear supporting portions (10, 11).

6 Claims, 15 Drawing Sheets

DIFFERENTIAL FOR VEHICLE

BACKGROUND OF THE INVENTION

1. Field of the Invention

The invention relates to a differential for a vehicle, and more particularly to a differential for a vehicle including a pinion gear shaft for preventing falling of a pinion gear which receives a rotation driving force from a drive side.

2. Description of Related Art

Heretofore, with regard to the prior art in this technical field, a differential for a vehicle as shown in FIG. 15 is known. This differential for a vehicle, for example, is described in Utility Model Registration No. 2,520,728 (refer to FIG. 1). This differential for a vehicle will now be described with reference to FIG. 15. Referring to FIG. 15, the differential 71 for a vehicle includes a differential case 72 which rotates by receiving an engine torque, side gears 73L and 73R which are provided in parallel with each other along an axis line of rotation of the differential case 72, and a pinion gear 74 which is engaged with each of the side gears 73L and 73R.

The differential case 72 is provided with a pinion gear insertion hole 75, and axle insertion holes 76L and 76R. Here, an axis line of the pinion gear insertion hole 75, and each of axis lines of the axle insertion holes 76L and 76R are at right angles to each other. In addition, the differential case 72 is provided with a recess groove 78 which is formed in an inner surface of the pinion gear insertion hole 75 and to which a snap ring 77 is fitted.

The side gears 73L and 73R are constituted by unbottomed cylindrical bevel gears which have a boss portion 79L and a gear portion 80L, and a boss portion 79R and a gear portion 80R, respectively. Also, the side gears 73L and 73R are disposed so as to be movable in the axis line of rotation of the differential case 72, and are supported rotatably within the differential case 72 so that the boss portions 79L and 79R face the axle insertion holes 76L and 76R, respectively. Axles 81L and 81R are spline-fitted into the side gears 73L and 73R, respectively, with parts of the axles 81L and 81R positioned within the axle insertion holes 76L and 76R, respectively. Annular sliding members 82L and 82R which are located in the circumstances of the boss portions 79L and 79R, respectively, are interposed between the gear portion 80L (back surface) of the side gear 73L, and an inner opening periphery of the axle insertion hole 76L, and between the gear portion 80R (back surface) of the side gear 73R, and an inner opening periphery of the axle insertion hole 76R, respectively.

The pinion gear 74 is constituted by an unbottomed cylindrical bevel gear. Also, the pinion gear 74 is retained by a pinion gear holding plate 83 interposed between the snap ring 77 and the pinion gear 74, and is rotatably supported within the pinion insertion hole 75. A pinion gear shaft 84 for preventing gear falling is inserted through a center of an axle of the pinion gear 74.

With the construction described above, when a torque is inputted from an engine side of the vehicle to the differential case 72 through a drive pinion and a ring gear, the differential case 72 rotates around the axis line of rotation. Next, when the differential case 72 rotates in such a manner, the rotating force is transmitted to the pinion gear 74, and moreover is transmitted from the pinion gear 74 to each of the side gears 73L and 73R. In this case, since the left-hand and right-hand axles are connected to the side gears 73L and 73R, respectively, through the spline fitting, the torque from the engine side is distributed depending on the driving situation of the vehicle to be transmitted to the left-hand and right-hand axles through the drive pinion, the ring gear, the differential case 72, the pinion gear 74, and the side gears 73L and 73R.

SUMMARY OF THE INVENTION

However, in the differential for a vehicle described in Utility Model Registration No. 2,520,728, an engagement portion between the pinion gear 74, and each of the side gears 73L and 73R is located only on the side of the axis line of rotation of the differential case 72 with respect to the sliding portion between the pinion gear 74 and the pinion gear insertion hole 75. For this reason, a reaction force, from the differential case 72 (pinion gear supporting surface) against the pinion gear 74, which is generated by the engagement between the side gears 73L and 73R, and the pinion gear 74 acts in a direction of inclining the pinion gear 74 at the time of rotation of the differential case 72. As a result, there is a possibility that the seizure or the partial abrasion is generated either in the pinion gear 74 or in the pinion gear hole 75. It is thought that in the differential for a vehicle described in Utility Model Registration No. 2,520,728, the pinion gear 74 is formed to have a larger diameter than that of each of the side gears 73L and 73R, and the pinion gear shaft 84 is inserted through the central portion of an axle of the pinion gear 74, thereby avoiding that problem. However, for the purpose of obtaining a sufficient differential limit force, the pinion gear 74 must not be rotatably supported by a pinion gear shaft 84, but an outer peripheral surface of the pinion gear 74 must frictionally slide on an inner peripheral surface of the pinion gear insertion hole 75 in a state of being parallel therewith. As a result, a gap defined between the inner peripheral surface of the pinion gear 74 and the outer peripheral surface of the pinion gear shaft 84 can not be made smaller than that defined between the outer peripheral surface of the pinion gear 74 and the inner peripheral surface of the pinion gear insertion hole 75. That is to say, the pinion gear 74 is not rotatably supported in a normal state by the pinion shaft 84. If the pinion gear 74 is rotatably supported in the normal state by the pinion shaft 84, this is made when the pinion gear 74 is inclined. Therefore, it is thought that even with the construction as described above, the inclination of the pinion gear 74 can not be yet reliably removed, especially, the seizure or the partial abrasion can not be prevented from being generated in an edge portion in a direction of the center of an axle of the pinion gear shaft 84 in the sliding portion between the pinion gear 74 and the pinion gear insertion hole 75. In addition, such a construction disables the diameter of each of side gears 20L and 20R from being made large. As a result, a surface pressure in the engagement portion between each of the side gears 20L and 20R, and the pinion gear 74 at the time of transmission of the torque to the axle is forced to be increased. Therefore, it is thought that a problem in strength is also caused. Conversely, when the sufficient strength is desired to be ensured, an entire differential controller 10 must be scaled up. In addition, the side gears 20L and 20R get away in the axle direction from each other because of the large diameter of the pinion gear 74, which results in that it is impossible to shorten a length of the differential controller 10 in the axle direction.

In the light of the foregoing, it is therefore an object of the invention to provide a differential for a vehicle which is capable of sufficiently exercising an effect of preventing inclination of each of pinion gears by a pinion gear shaft without causing scale-up of the differential for a vehicle, thereby obtaining a satisfactory engagement state between the pinion gear and each of side gears.

In order to attain the above-mentioned object, according to an embodiment of the invention, there is provided a differential for a vehicle, including: a differential case; one pair of side gears rotatably accommodated in the differential case; at least one pair of pinion gears engaged at right angles with the one pair of side gears, shaft insertion holes being provided in central portions of axles of the at least one pair of pinion gears, respectively; and a pinion gear shaft inserted through the shaft insertion holes and supported by the differential case; in which the differential case has a first pinion gear supporting portion for rotatably supporting outer peripheral surfaces of the at least one pair of pinion gears, the pinion gear shaft has a second pinion gear supporting portion for rotatably supporting the at least one pair of pinion gears by sliding on inner surfaces of the shaft insertion holes, and the second pinion gear supporting portion is disposed on a side of an axis line of rotation of the differential case with respect to the first pinion gear supporting portion.

In addition, in order to attain the above-mentioned object, according to another embodiment of the invention, there is provided a differential for a vehicle, including: a differential case; one pair of side gears rotatably accommodated in the differential case; at least one pair of pinion gears engaged at right angles with the one pair of side gears, each of the at least one pair of pinion gears having hole portions each opening on a side of an axis line of rotation of the differential case; and a supporting member interposed between the at least one pair of pinion gears, and between the one pair of side gears; in which the differential case has a first pinion gear supporting portion for rotatably supporting outer peripheral surfaces of the at least one pair of pinion gears, and the supporting member has a second pinion gear supporting portion for being brought into contact with opening inner surfaces of the hole portions to rotatably support the at least one pair of pinion gears.

According to the embodiments of the invention, it is possible to sufficiently exercise the effect of preventing inclination of each of the pinion gears by the pinion gear shaft, and thus it is possible to obtain the satisfactory engagement state between the at least one pair of pinion gears and the one pair of side gears.

DETAILED DESCRIPTION OF THE PREFERRED EMBODIMENTS

Preferred embodiments of the invention will be described in detail hereinafter with reference to the accompanying drawings.

First Embodiment

Figure 1:
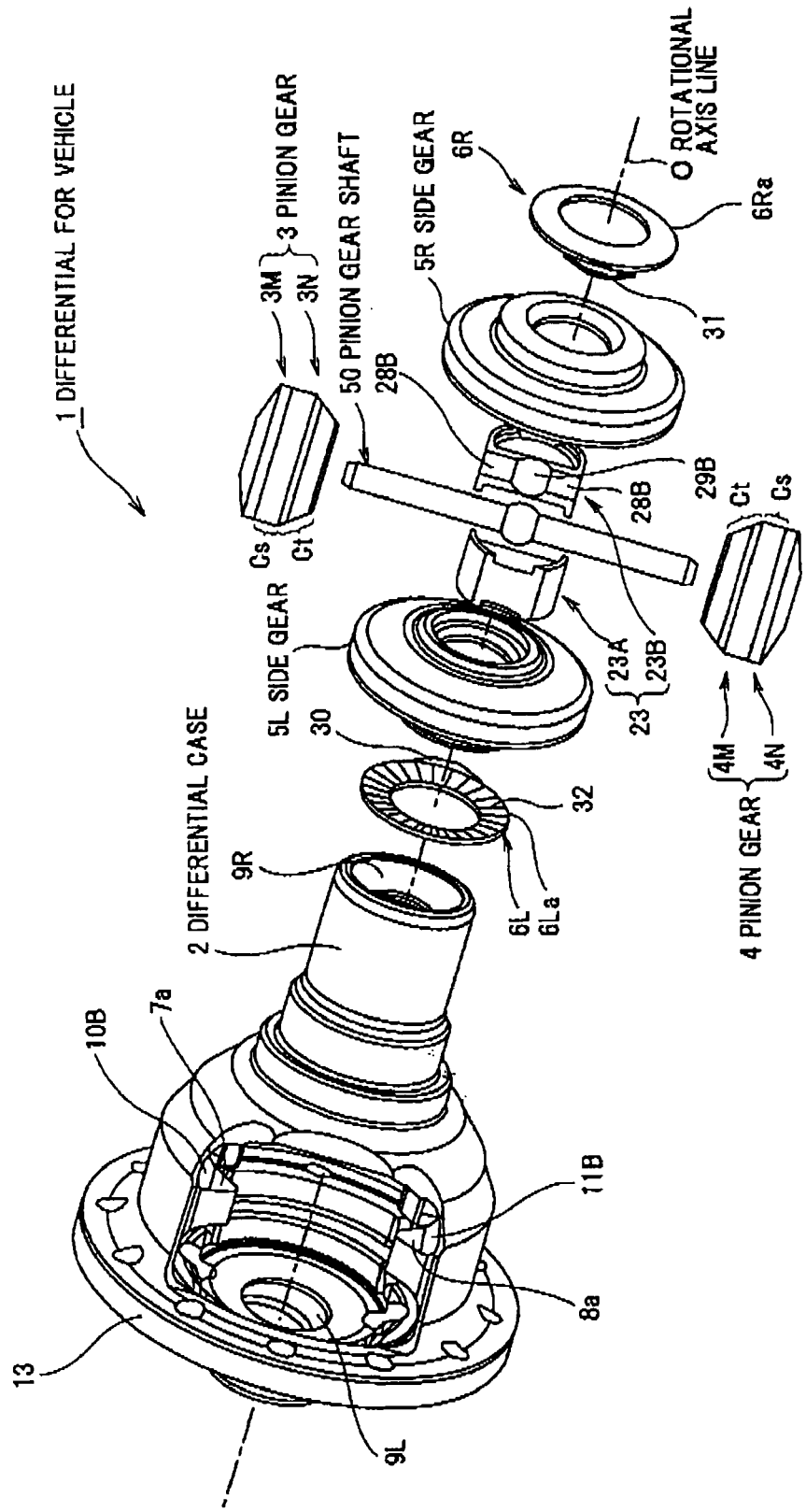
FIG. 1 is an exploded perspective view explaining a differential for a vehicle according to a first embodiment of the invention.
Figure 2:
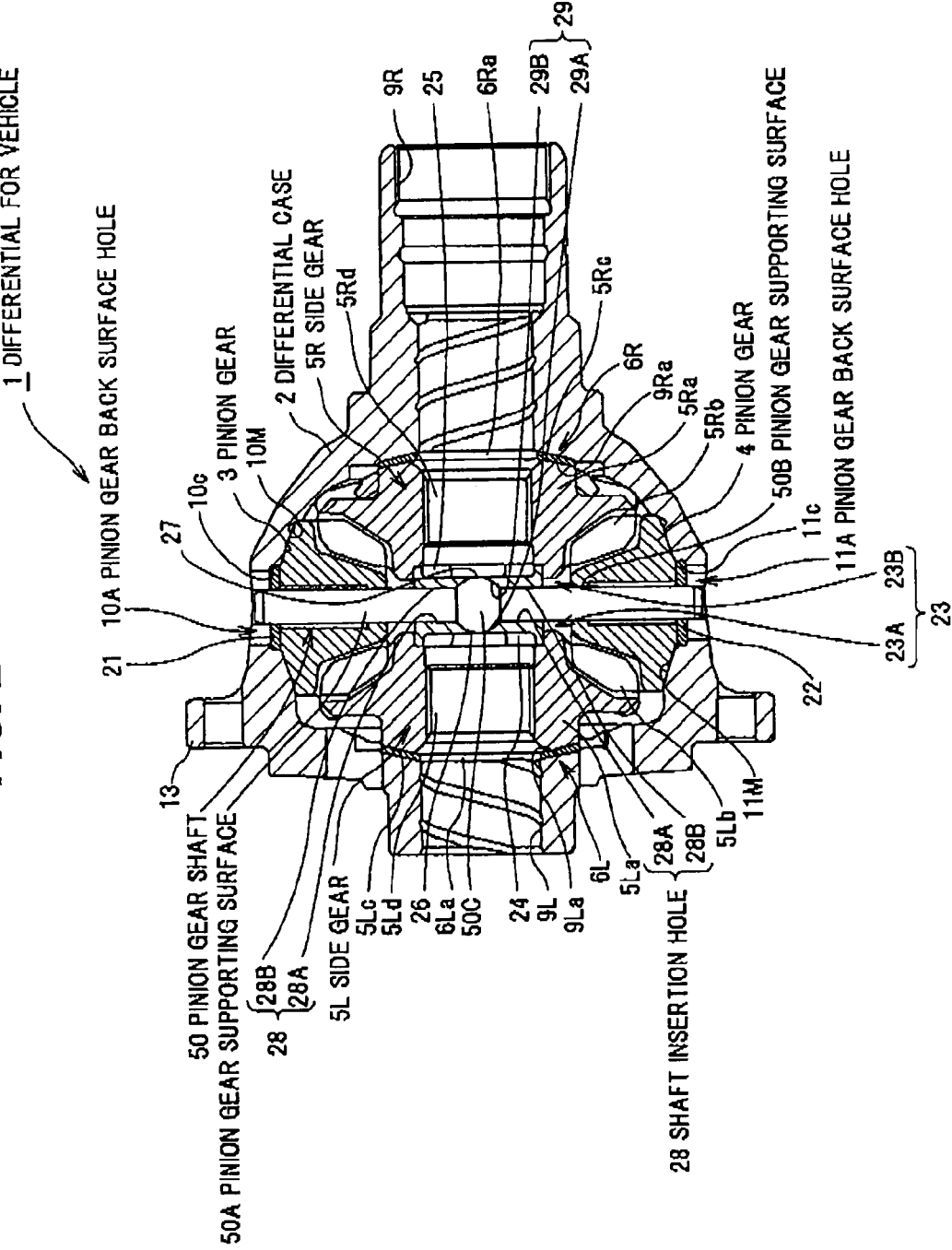
FIG. 2 is a cross sectional view explaining the differential for a vehicle according to the first embodiment of the invention.
Figure 3:
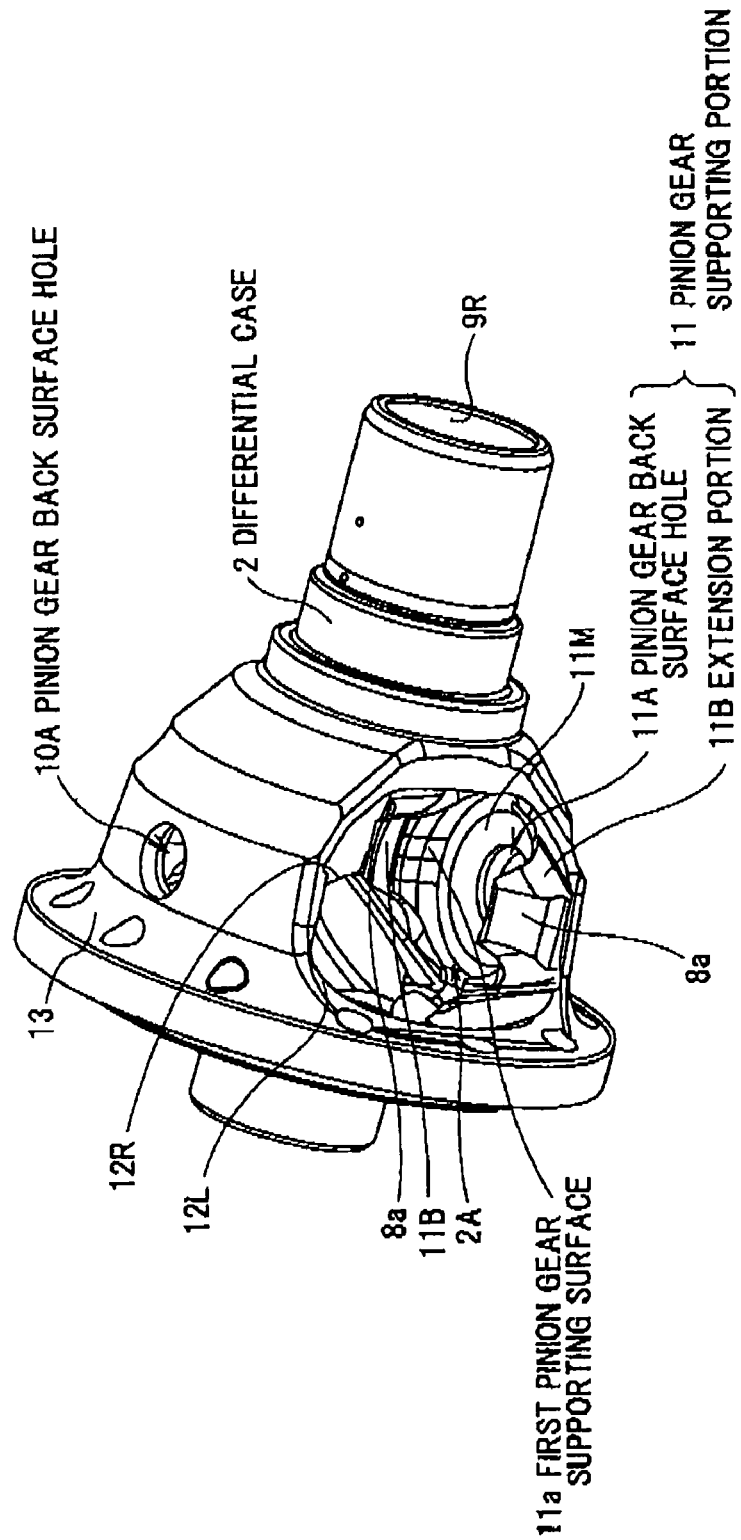
FIG. 3 is a perspective view explaining a differential case of the differential for a vehicle according to the first embodiment of the invention.
Figure 4:
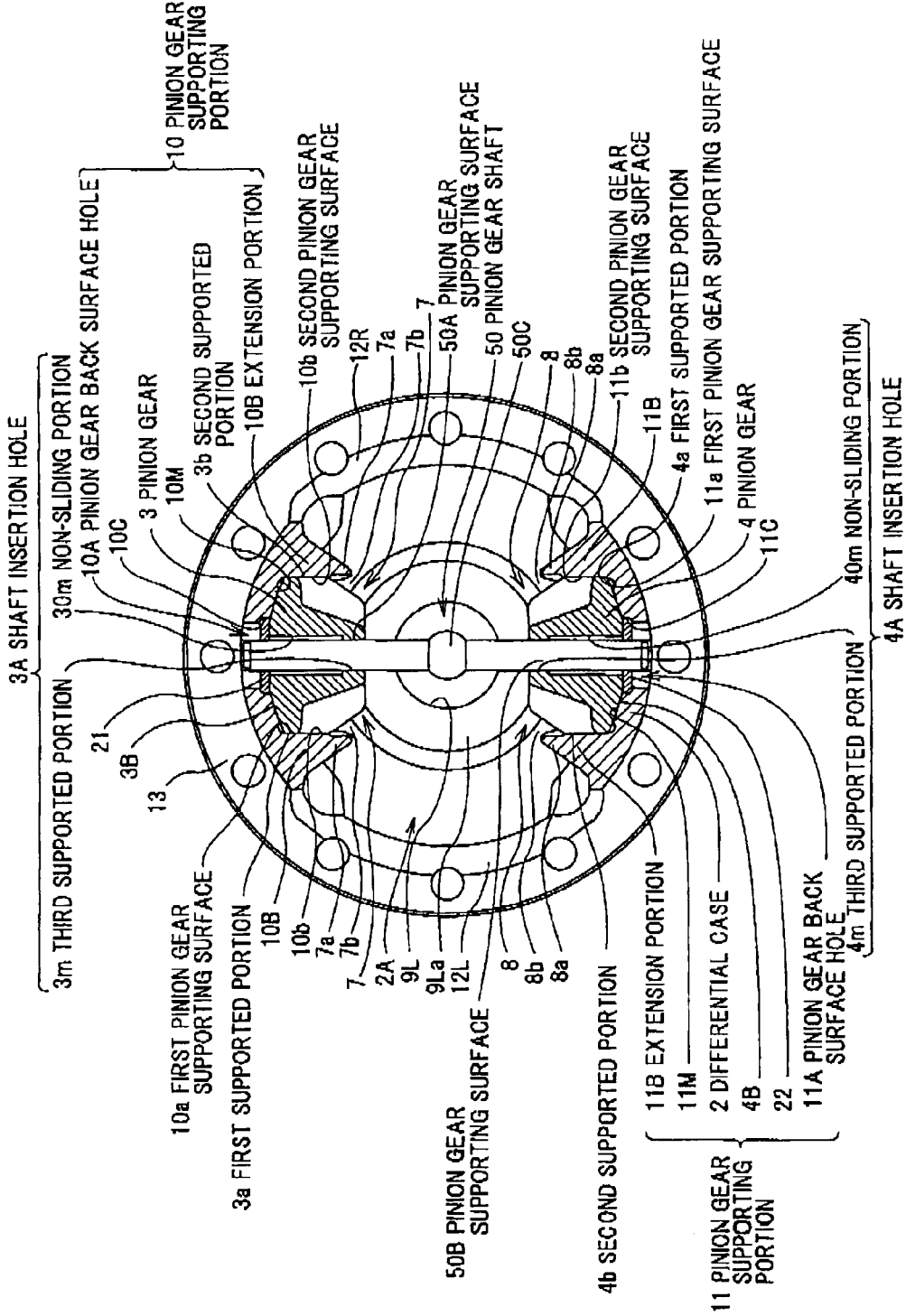
FIG. 4 is a cross sectional view showing an assembled pinion gear of the differential for a vehicle according to the first embodiment of the invention in a state of being cut at right angles to an axis line of rotation of the differential case shown in FIG. 3.
Figure 5:
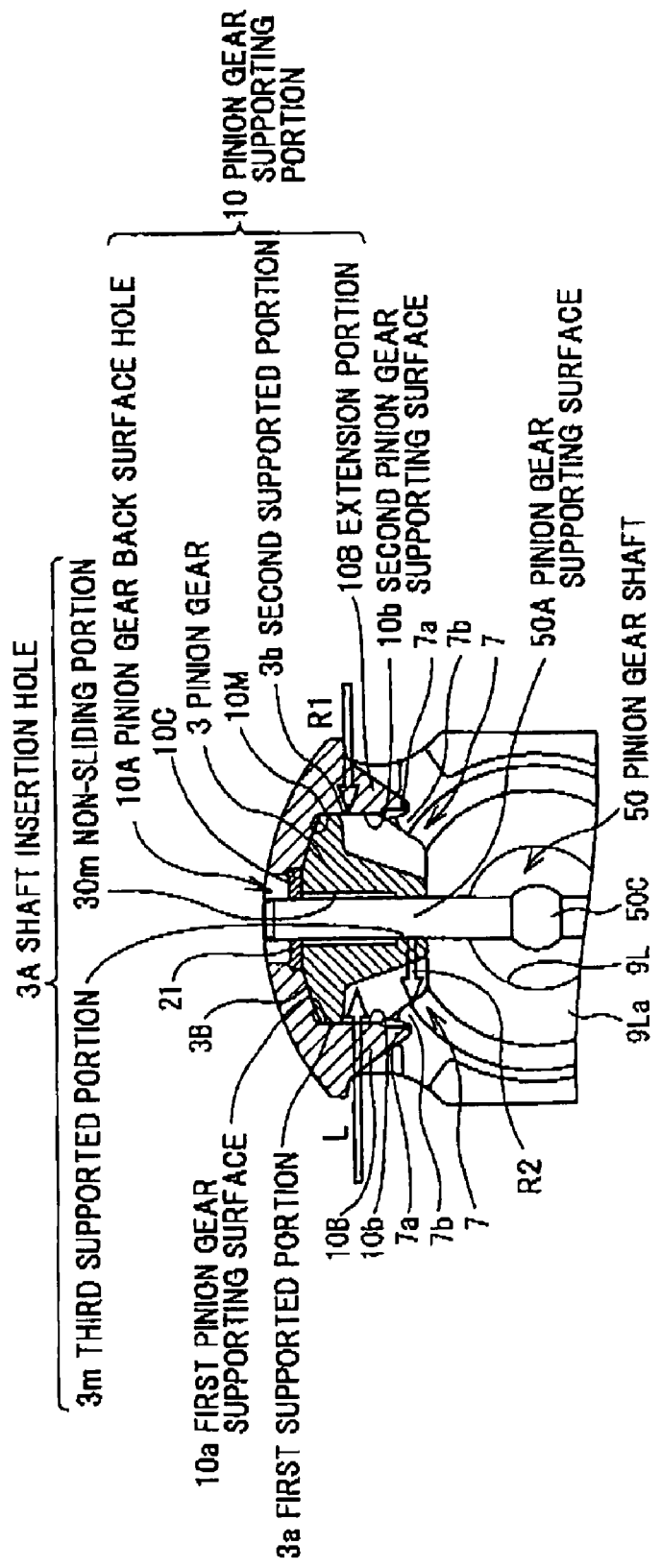
FIG. 5 is a cross sectional view explaining a stable operation of the pinion gear in the differential for a vehicle according to the first embodiment of the invention.
Figure 6:
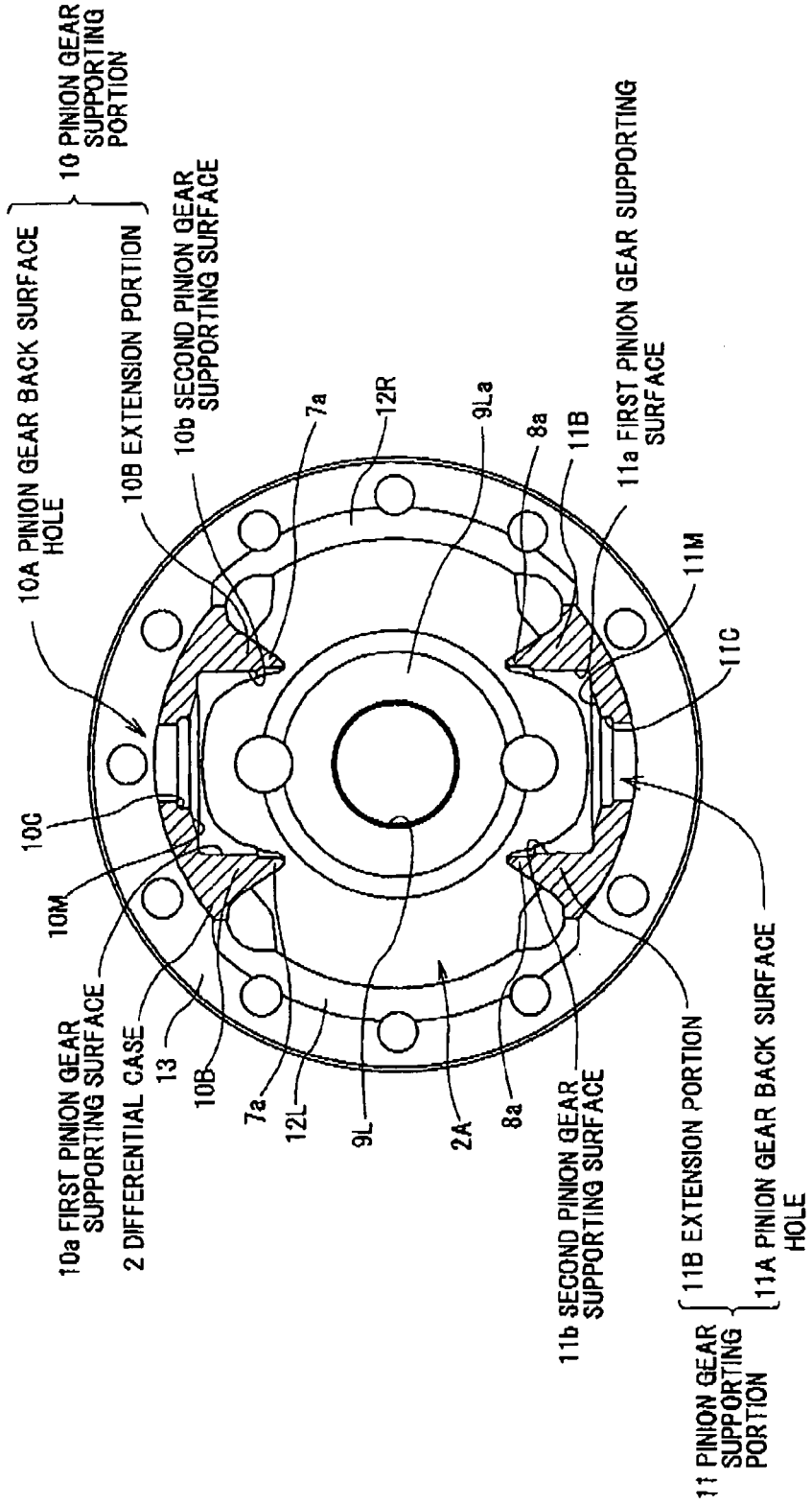
FIG. 6 is a cross sectional view explaining the differential case in the differential for a vehicle according to the first embodiment of the invention.
Figure 7:
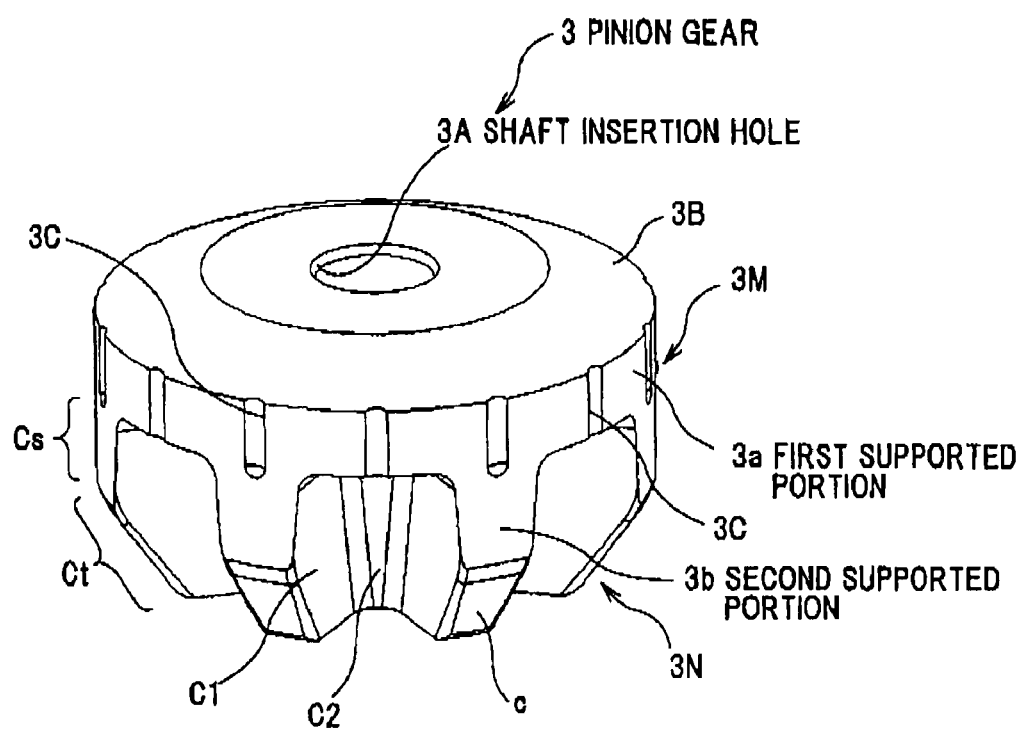
FIG. 7 is a perspective view explaining the pinion gear of the differential for a vehicle according to the first embodiment of the invention.

FIG. 1 is an exploded perspective view explaining a differential for a vehicle according to a first embodiment of the invention. FIG. 2 is a cross sectional view explaining the differential for a vehicle according to the first embodiment of the invention. FIG. 3 is a perspective view explaining a differential case of the differential for a vehicle according to the first embodiment of the invention. FIG. 4 is a cross sectional view showing an assembled pinion gear of the differential for a vehicle according to the first embodiment of the invention in a state of being cut at right angles to an axis line of rotation of the differential case shown in FIG. 3. FIG. 5 is a cross sectional view explaining a stable operation of the pinion gear in the differential for a vehicle according to the first embodiment of the invention. FIG. 6 is a cross sectional view explaining the differential case in the differential for a vehicle according to the first embodiment of the invention. Also, FIG. 7 is a perspective view explaining the pinion gear of the differential for a vehicle according to the first embodiment of the invention.

(Entire Construction of Differential for Vehicle)

Referring to FIGS. 1 and 2, a differential 1 for a vehicle is roughly composed of a differential case 2 which rotates by receiving an engine torque, a pinion gear shaft 50 which is located on an axis line at right angles to an axis line, O, of rotation of the differential case 2, one pair of (upper and lower two) pinion gears 3 and 4 which are disposed in parallel with each other on the pinion gear shaft 50, one pair of (left-hand and right-hand two) side gears 5L and 5R which are engaged at right angles with the upper and lower two pinion gears 3 and 4, and thrust washers 6L and 6R which are located on back surface sides of the left-hand and right-hand two side gears 5L and 5R, respectively.

(Construction of Differential Case 2)

As shown in FIGS. 3 and 4, the differential case 2 has in its inside a space portion 2A for accommodating therein the pinion gears 3 and 4, the side gears 5L and 5R, and the thrust washers 6L and 6R, and differential oil introducing portions 7 and 8 for introducing a differential oil into a space defined between sliding surfaces (first supported portions 3a and 4a of base portions 3M and 4M which will be described later, and second supported portions 3b and 4b of gear portions 3N and 4N which will be described later) of the pinion gears 3 and 4, and supporting surfaces (first pinion gear supporting surfaces 10a and 10b of pinion gear back surface holes 10A and 11A which will be described later, and second pinion gear supporting surfaces 10b and 11b of extension portions 10B and 11B which will be described later) of pinion gear supporting portions 10 and 11. Also, the entire differential case 2 is formed in the form of an integral one-piece member.

As shown in FIGS. 4 and 6, the differential oil introducing portions 7 and 8 are composed of protrusions 7a and 8a for paddling the differential oil by rotation of the differential case 2, and the pinion gears 3 and 4. The protrusions 7 and 8 are formed integrally with the extension portions 10B and 11B which will be described later so as to extend from second pinion gear supporting surfaces 10b and 11b to the side of the axis line of rotation of the differential case 2, respectively, and are disposed in two positions along rotation directions of the pinion gears 3 and 4, respectively. Spaces 7b and 8b defined by the protrusions 7a and 8a, and the pinion gears 3 and 4 open on the side of the axis line of rotation of the differential case 2, and around the axis lines of the pinion gear supporting portions 10 and 11 so as to introduce thereinto the differential oil.

As shown in FIGS. 1, 2 and 6, the differential case 2 is provided with left-hand and right-hand two axle insertion holes 9L and 9R which open along an axis line, O, of rotation, and the pair of upper and lower pinion gear supporting portions 10 and 11 which have the axis lines in a direction at right angles to the axis lines of the axle insertion holes 9L and 9R. In addition, as shown in FIGS. 2 and 3, the differential case 2 is provided with side gear passing holes 12L and 12R which are located in respective regions symmetrical with respect to the axis line, O, of rotation, that is, portions which are circumferentially located at equal intervals away from the pinion gear supporting portions 10 and 11. As shown in FIGS. 1 to 3, an annular ring gear attaching flange 13 is integrally provided on the side of the left-hand axle of the differential case 2 so as to be parallel with the circumferential direction within a plane at right angles to the axis line, O, of rotation.

The axle insertion holes 9L and 9R, as shown in FIG. 2, are formed in the form of through holes each opening in a direction along the axis line, O, of rotation. Left-hand and right-hand axles (not shown) are inserted through the axle insertion holes 9L and 9R, respectively. Thrust washer receiving portions 9La and 9Ra, each having a spherical surface, which receive the thrust washers 6L and 6R, respectively, are provided in the inner opening peripheries of the axle insertion holes 9L and 9R, respectively.

As shown in FIG. 4, the pinion gear supporting portions 10 and 11 are composed of a pinion gear back surface hole 10A and an extension portion 10B, and a pinion gear back surface hole 11A and an extension portion 11B, respectively.

As shown in FIGS. 2, 4 and 6, each of the pinion gear back surface holes 10A and 11A is formed in the form of a stepped through hole which opens inside and outside the differential case 2 and in which the inside of the differential case 2 is enlarged in its diameter while having an axis line at right angles to the axis line, O, of rotation. Also, each of the pinion gear back surface holes 10A and 11A functions as a processing hole as well for a pinion gear supporting hole. An inner opening size of each of the pinion gear back surface holes 10A and 11A is set as a size having a minor diameter (a minor diameter smaller than the major diameter of each of the side gears 5L and 5R) approximately equal to a major diameter of each of the pinion gears 3 and 4. Inner surfaces of the pinion gear back surface holes 10A and 11A are formed in the form of first pinion gear supporting surfaces 10a and 11a which rotatably support first supported portions (portions other than the second supported portions 3b and 4b as outer peripheral surfaces of portions provided with tooth surfaces of gears) 3a and 4a as sliding portions of the pinion gears 3 and 4, and first pinion gear supporting surfaces 10a and 12a which relatively slide on the first supported portions 3a and 4a, respectively.

As shown in FIGS. 2, 4 and 6, first stepped surfaces of the pinion gear back surface holes 10A and 11A are respectively provided with pinion gear receiving portions (top portions) 10M and 11M which are formed in the form of spherical surfaces each having a predetermined curvature, and which receive the pinion gears 3 and 4 on each of which a centrifugal force acts. Second stepped surfaces of the pinion gear back surface holes 10A and 11A are respectively provided with washer receiving portions 10C and 11C which receive annular washers 21 and 22 each serving as a stopper body. As shown in FIGS. 5 and 6, the annular washers 21 and 22 are interposed between a back surface of the pinion gear 3 (a fourth supported portion 3B) and the washer receiving portion 10C, and between a back surface of the pinion gear 4 (a fourth supported portion 4B) and the washer receiving portion 11C, respectively.

As shown in FIG. 4, the extension portions 10B and 11B which are disposed in parallel at equal intervals in the circumferential direction so as to extend to the side of the axis line of rotation of the differential case 2 (the inside of the differential case 2) are integrally provided in the inner opening peripheries of the pinion gear back surface holes 10A and 11A, respectively. Second pinion gear supporting surfaces 10b and 11b are provided in the extension portions 10B and 11B, respectively. The second pinion gear supporting surfaces 10b and 11b support second supported portions 3b and 4b corresponding to the outer peripheral surfaces of the portions having the tooth surfaces of the pinion gears 3 and 4 formed therein, respectively. The second pinion gear supporting surfaces 10b and 11b are articulated with first pinion gear supporting surfaces 10a and 11a, respectively. The second pinion gear supporting surfaces 10b and 11b correspond, together with the first pinion gear supporting surfaces 10a and 11a, to "a first pinion gear supporting portion" of the invention. At least parts of the second pinion gear supporting surfaces 10b and 11b are disposed on a side opposite to the axis line, O, of rotation of the differential case 2 with respect to the engagement portions between the pinion gears 3 and 4, and the side gears 5L and 5R in an axial direction of the pinion gear shaft 50.

As shown in FIGS. 3 and 4, each of the side gear passing holes 12L and 12R is formed in the form of a through hole having an opening portion having a planar non-circular shape. Also, the opening sizes of the side gear passing holes 12L and 12R are set as sizes allowing the pinion gears 3 and 4, and the side gears 5L and 5R to be inserted into the differential case 2.

(Construction of Pinion Gear Shaft 50)

As shown in FIGS. 2 and 4, the pinion gear shaft 50 has pinion gear supporting surfaces 50A and 50B which rotatably support the pinion gears 3 and 4, respectively, and is inserted through the pinion gears 3 and 4 (the shaft insertion holes 3A and 4A), and the washers 21 and 22 to be supported by the pinion gear back surface holes 10A and 11A of the differential case 2. The pinion gear supporting surfaces 50A and 50B correspond to "a second pinion gear supporting portion" of the invention. At least parts of the pinion gear supporting surfaces 50A and 50B are disposed on the side of the axis line, O, of rotation with respect to the engagement portions between the pinion gears 3 and 4, and the side gears 5L and 5R in the axial direction of the pinion gear shaft 50.

In addition, the pinion gear supporting surfaces 50A and 50B are disposed on the side of the axis line, O, of rotation of the differential case 2 with respect to the pinion gear supporting portions 10 and 11. More specifically, the pinion gear supporting surfaces 50A and 50B are disposed at a predetermined interval on the side of the axis line, O, of rotation with respect to the second pinion gear supporting surfaces 10b and 11b in the axial direction of the pinion gear shaft 50. A spherical bulge portion 50C protruding in a radial direction of the pinion gear shaft 50 is integrally provided approximately at a central portion in the direction of the axis line of the pinion gear shaft 50.

(Construction of Pinion Gears 3, 4)

Since the pinion gears 3 and 4 have approximately the same construction, for example, only the pinion gear 3 will now be described. It is noted that reference symbols of the portions of the pinion gear 4 are given so as to correspond to those of the portions of the pinion gears 3 (for example, a base portion of the pinion gear 4 is designated with reference symbol 4M so as to correspond to a base portion 3M of the pinion gear 3, and a gear portion of the pinion gear 4 is designated with reference symbol 4N so as to correspond to a gear portion 3N of the pinion gear 3), and thus a description thereof is omitted here for the sake of simplicity.

As shown in FIGS. 1 and 7, the pinion gear 3 is constituted by a bevel gear in which the base portion 3M having a peripheral surface having a predetermined major diameter, and the gear portion 3N having concave teeth C1 and tooth grooves C2 alternately disposed in parallel with each other in a circumferential direction are formed in the outer peripheral portion. In addition, as shown in FIG. 4, the pinion gear 3 is rotatably supported by the first pinion gear supporting surface 10a of the pinion gear back surface hole 10A, the second pinion gear supporting surface 10b of the extension portion 10B, and the pinion gear supporting surface 50A of the pinion gear shaft 50. It is noted that the side of the pinion gear 3, of the both sides in the direction of the rotation axis, which is located on the side of the axis line, O, of rotation of the differential case 2 when the pinion gear 3 is assembled to the differential case 2 is defined as a gear head side, and the side of the pinion gear 3 which is located on the side opposite to that side is defined as a gear base side.

The pinion gear 3 is provided with a plurality of recess grooves 3C, 3C, . . . serving as a differential oil inflowing portion which open to the first supported portion 3a as the sliding surface for the first pinion gear supporting surface 10a of the pinion gear back surface hole 10A.

A shaft insertion hole 3A through which the pinion gear shaft 50 is inserted is provided at the central portion of an axle of the pinion gear 3. The shaft insertion hole 3A is formed in the form of a stepped hole having large and small two inner surfaces which are different in minor diameter from each other. One, having the smaller minor diameter, of both the inner surfaces of the shaft insertion hole 3A is formed by a third supported portion 3m which slides on the pinion gear supporting surface 50A of the pinion gear shaft 50. The other (a portion other than the third supported portion 3m), having the larger minor diameter, of both the inner surfaces of the shaft insertion holes 3A and 4A is formed by a non-sliding portion 30m which does not slide on the outer peripheral surface of the pinion gear shaft 50.

Figure 8:
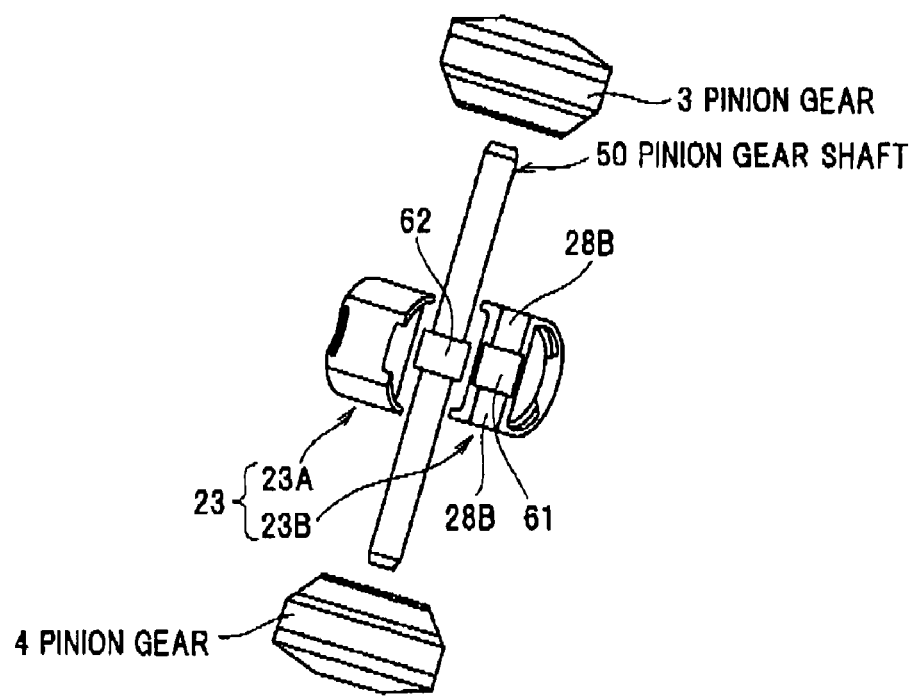
FIG. 8 is an exploded perspective view explaining another example of fitting between a pinion gear shaft and an axle movement regulating member in the differential for a vehicle according to the first embodiment of the invention.

As shown in FIGS. 1 and 7, the base portion 3M is formed in an end portion on a side opposite to the side gear side end portion of the pinion gear 3, that is, a portion except for a side gear engagement portion which is engaged with each of the side gears 5L and 5R. As shown in FIGS. 7 and 8, a first supported portion 3a corresponding to the first pinion gear supporting surface 10a of the pinion gear back surface hole 10A, and a second supported portion 3b corresponding to the second pinion gear supporting surface 10b of the extension portion 10B are provided in an outer peripheral surface of the base portion 3M. A fourth supported portion 3B which is formed in the form of a spherical surface adapted to the pinion gear receiving portion 10M of the pinion gear back surface hole 10A is provided on a back surface of the pinion gear 3.

The gear portion 3N, as shown in FIG. 7, is composed of a straight portion Cs including the second supported portion 3b of the pinion gear 3, and a tapered portion Ct articulated with the straight portion Cs. Also, the gear portion 3N is engaged with each of the side gears 5L and 5R on the side of the axis line, O, of rotation of the differential case 2. The gear portion 3N, as shown in FIG. 2, is engaged with each of the gear portions of the side gears 5L and 5R. Also, a portion (a central point in engagement) in which a surface pressure becomes highest at the time of transmission of the torque from the pinion gear 3 to each of the side gears 5L and 5R is located in the vicinity of a central point of a tooth surface of the gear portion 3N. A tooth top surface c (a part of a tooth top surface of the gear engagement portion continuous to the outer peripheral surface of the base portion 3M) of the concave tooth C1 in the straight portion Cs is formed by a peripheral surface having a predetermined major diameter. The tooth top surface c of the convex tooth C1 in the tapered portion Ct is formed by a peripheral surface which becomes smaller toward the gear head portion from the gear base portion.

(Construction of Side Gears 5L, 5R)

The side gears 5L and 5R, as shown in FIG. 2, are constructed by approximately annular gears (the bevel gears each having a larger major diameter than that of each of the pinion gears 3 and 4, and each having a single tooth top conical angle) which have the boss portions 5La and 5Lb different in major diameter from each other, and the gear portions 5Lb and 5Rb. In addition, the side gears 5L and 5R are rotatably supported within the differential case 2, and are engaged with the pinion gears 3 and 4. The number of teeth of each of the side gears 5L and 5R is set as being 2.1 times or more as large as that of each of the pinion gears 3 and 4 (for example, the number of teeth of each of the pinion gears 3 and 4 is set to 7, while the number of teeth of each of the pinion gears 5L and 5R is set to 15). The major diameter of each of the side gears 5L and 5R is set as a size which is larger than each of the major diameter of each of the pinion gears 3 and 4, and the size of each of the extension portions 10B and 11B.

Sliding portions 5Lc and 5Rc which are constituted by spherical surfaces adapted to the thrust washer receiving portions 9Lc and 9Rc through the thrust washers 6L and 6R are provided on the back surfaces of the side gears 5L and 5R, respectively. Left-hand and right-hand axles (not shown) are inserted through the axle insertion holes 9L and 9R to be spline-fitted into the side gears 5L and 5R, respectively. An axle spacer 23 as an axle movement regulating member, as shown in FIG. 2, is interposed between the side gears 5L and 5R.

As shown in FIGS. 1 and 2, the axle spacer 23 has recess portions 24 and 25 having both end portions into which the head portions of the left-hand and right-hand axles are fitted, respectively, and is disposed on the axis line, O, of rotation of the differential case 2. In addition, the entire axle spacer 23 is formed in the form of an approximately columnar body obtained by combining a pair of spacer elements 23A and 23B. As a result, the connection (spline-fitting) between the side gears 5L and 5R, and the left-hand and right-hand axles is smoothly and reliably carried out. Bottom surfaces of the recess portions 24 and 25 are formed by engagement surfaces 26 and 27 with which the head portions of the axles are engaged, respectively.

The axle spacer 23 is provided with a columnar shaft insertion hole 28 through which the pinion gear shaft 50 is inserted, and a spherical inner space 29 to which the bulge portion 50C of the pinion gear shaft 50 is fitted to be fixed. The shaft insertion hole 28 is formed by providing approximately semi-columnar space portions 28A and 28B in the spacer elements 23A and 23B, respectively. The inner space 29 is formed by providing approximately semi-spherical spaces 29A and 29B in the spacer elements 23A and 23B, respectively. Also, the shaft insertion hole 28 and the inner space 29 prevent the pinion gear shaft 50 from being displaced.

(Construction of Thrust Washers 6L, 6R)

The thrust washers 6L and 6R, as shown in FIGS. 1 and 2, are constituted by annular washers having washer main bodies 6La and 6Ra which receive thrust forces from the side gears 5L and 5R, respectively. In addition, the thrust washers 6L and 6R are interposed between the back surface of the side gear 5L and the thrust washer receiving portion 9Lc, and between the back surface of the side gear 5R and the thrust washer receiving portion and 9Rc, respectively. Also, the thrust washers 6L and 6R adjust the engagement between the side gears 5L and 5R, and the pinion gears 3 and 4. Planar approximately T-like engagement pieces 30 and 31 which can be plastic-deformed are integrally on the outer peripheries of the thrust washers 6L and 6R, respectively. The engagement pieces 30 and 31 are plastic-deformed to be engaged with the outer peripheral surfaces of the side gears 5L and 5R, respectively, and also are disposed in the respective positions allowing the rotation of the side gears 5L and 5R. In addition, the engagement pieces 30 and 31 prevent the thrust washers 6L and 6R from being deformed radially with respect to the side gears 5L and 5R, respectively. The thrust washers 6L and 6R are provided with differential oil introducing paths 32 (only one of them is illustrated in FIG. 1) for introducing the differential oil from the washer inner peripheral portions into the washer outer peripheral portions.

[Operation of Differential 1 for Vehicle]

When the torque from the engine side of the vehicle is inputted to the differential case 2 through the drive pinion and the ring gear, the differential case 2 rotates around the axis line, O, of rotation. When the differential case 2 rotates, the rotating force is transmitted to the pinion gears 3 and 4 through the pinion gear shaft 50, and is then transmitted from the pinion gears 3 and 4 to the side gears 5L and 5R, respectively. In this case, since the axles (not shown) are spline-fitted into the left-hand and right-hand side gears 5L and 5R, respectively, the torque from the engine side is transmitted to the left-hand and right-hand axles through the drive pinion, the ring gear, the differential case 2, the pinion gear shaft 50, the pinion gears 3 and 4, and the side gears 5L and 5R.

Here, in the case where no skid occurs between the each of left-hand and right-hand wheels and a road surface because the vehicle is in a state of going straight, when the torque is transmitted from the engine side to the differential case 2, the pinion gears 3 and 4 move around the central axes of the side gears 5L and 5R without rotating on their axes, and the pinion gears 3 and 4, and the side gears 5L and 5R rotate together with the differential case 2 and the pinion gear shaft 50. As a result, the torque is equally transmitted from the engine side to the left-hand and right-hand axles, so that the left-hand and right-hand wheels rotate at the equal number of rotations.

On the other hand, in the case where for example, the right-hand wheels of the vehicle is mired in the muddy area and thus the skid occurs between each of the right-hand wheels, and the road surface, the pinion gears 3 and 4 rotate on their axes while being engaged with the side gears 5L and 5R. As a result, the torque from the engine side is differentially distributed between the left-hand and right-hand axles (wheels). That is to say, each of the left-hand wheels rotates at a lower speed than a rotating speed of the differential case 2, and each of the right-hand wheels rotates at a higher speed than the rotating speed of the differential case 2.

In this embodiment, when the pinion gears 3 and 4 rotate in the state in which the torque acts on the differential case 2, the first supported portions 3a and 4a, and the second supported portions 3b and 4b slide on the first pinion gear supporting surfaces 10a and 11a, and the second pinion gear supporting surfaces 10b and 11b, respectively. Also, the third supported portions 3m and 4m slide on the pinion gear supporting surfaces 50A and 50B of the pinion gear shaft 50, respectively. As a result, frictional resistances are generated between the first supported portions 3a and 4a, and the first pinion gear supporting surfaces 10a and 11a, and between the second supported portions 3b and 4b, and the second pinion gear supporting surfaces 10b and 11b, respectively. The differential rotations of the side gears 5L and 5R are limited by those frictional resistances, thereby supporting the skid occurring between each of the left-hand and right-hand wheels, and the road surface. On this occasion, as shown in FIG. 5, when loads L are applied from the side gears 5L and 5R to the pinion gears 3 and 4 by the engagement between the side gears 5L and 5R, and the pinion gears 3 and 4, respectively, reaction forces R1 and R2 from the differential case 2 (the first pinion gear supporting surfaces 10a and 11a, and the second pinion gear supporting surfaces 50A and 50B) act on the pinion gears 3 and 4. As a result, the pinion gears 3 and 4 slide on the pinion gear shaft 50 in a stable state (without being inclined).

Thrust force in the direction of the rotation axis of the pinion gears 3 and 4 is generated on each of the engagement surfaces with the side gears 5L and 5R by the rotations of the pinion gears 3 and 4, respectively. The side gears 5L and 5R are moved in a direction of getting away from each other by the thrust force, thereby pressing the thrust washers 6L and 6R against the thrust washer receiving portions 9Lc and 9Rc, respectively. As a result, the frictional resistances are generated between the thrust washers 6L and 6R, and the thrust washer receiving portions 9Lc and 9Rc, respectively. Thus, the differential rotations of the side gears 5L and 5R are limited by those frictional resistances as well. Moreover, the fourth supported portions 3B and 4B of the pinion gears 3 and 4 are pressed against the pinion gear portions 10M and 11M of the differential case 2 by the thrust force generated in each of the pinion gears 3 and 4. As a result, the frictional resistances against the rotations of the pinion gears 3 and 4 are generated. Thus, the differential rotations of the side gears 5L and 5R are limited by those frictional resistances as well.

According to the first embodiment described above of the invention, the following effects are obtained.

The pinion gear shaft 50 is inserted through the pinion gears 3 and 4, and the washers 21 and 22 to be supported by the pinion gear back surface holes 10A and 11A of the differential case 2. Moreover, the pinion gear supporting surfaces 50A and 50B are disposed on the side of the axis line, O, of rotation of the differential case 2 with respect to the pinion gear supporting portions 10 and 11. As a result, the pinion gears 3 and 4 stably slide on the pinion gear shaft 50. Consequently, it is possible to sufficiently exercise the effect of preventing the inclination of the pinion gears 3 and 4 by the pinion gear shaft 50. Thus, it is possible to obtain the satisfactory engagement state between the pinion gears 3 and 4, and the side gears 5L and 5R.

It should be noted that although in this embodiment, the description has been given so far with respect to the case where the fitting state between the axle spacer 23 and the pinion gear shaft 50 is obtained by the spherical inner space 29 and the spherical bulge portion 50C, the invention is not limited thereto. That is to say, as shown in FIG. 8, that fitting state can also be obtained by columnar inner spaces (only a semi-columnar space portion 61 formed in the space element 23B is illustrated in the figure), and a columnar bulge portion 62. The shapes of the inner space and the bulge portion can be freely and suitably changed as long as each of them has a fitting structure with which the pinion gear shaft 50 can be fixed to the axle spacer 23. In addition, a notch axially extending may be provided in the pinion gear shaft 50, and an engagement portion which is engaged with the notch to regulate the axial movement of the pinion gear shaft 50 may be formed in the axle spacer 23. In addition thereto, the pinion gear shaft 50 may not be fixed to the axle spacer 23, but parts of the pinion gear back surface holes 10A and 11A either may be made small in their diameters or may be closed, and the pinion gear shaft 50 may be fixed to the differential case 2.

In addition, although in this embodiment, the description has been given so far with respect to the case where the pinion gears 3 and 4 which are engaged with the side gears 5L and 5R, respectively, are a pair of pinion gears, the invention is not limited thereto. That is to say, the same effects as those of this embodiment are offered in the case as well of using multiple pairs of pinion gears. For example, when two pairs of pinion gears are used, three or four pinion gear shafts are supported by the differential case 2, and end portions of these pinion gear shafts on the side opposite to the support side end portions thereof are fixed to the axle space 23 to be integrated therewith.

Second Embodiment

Figure 9:
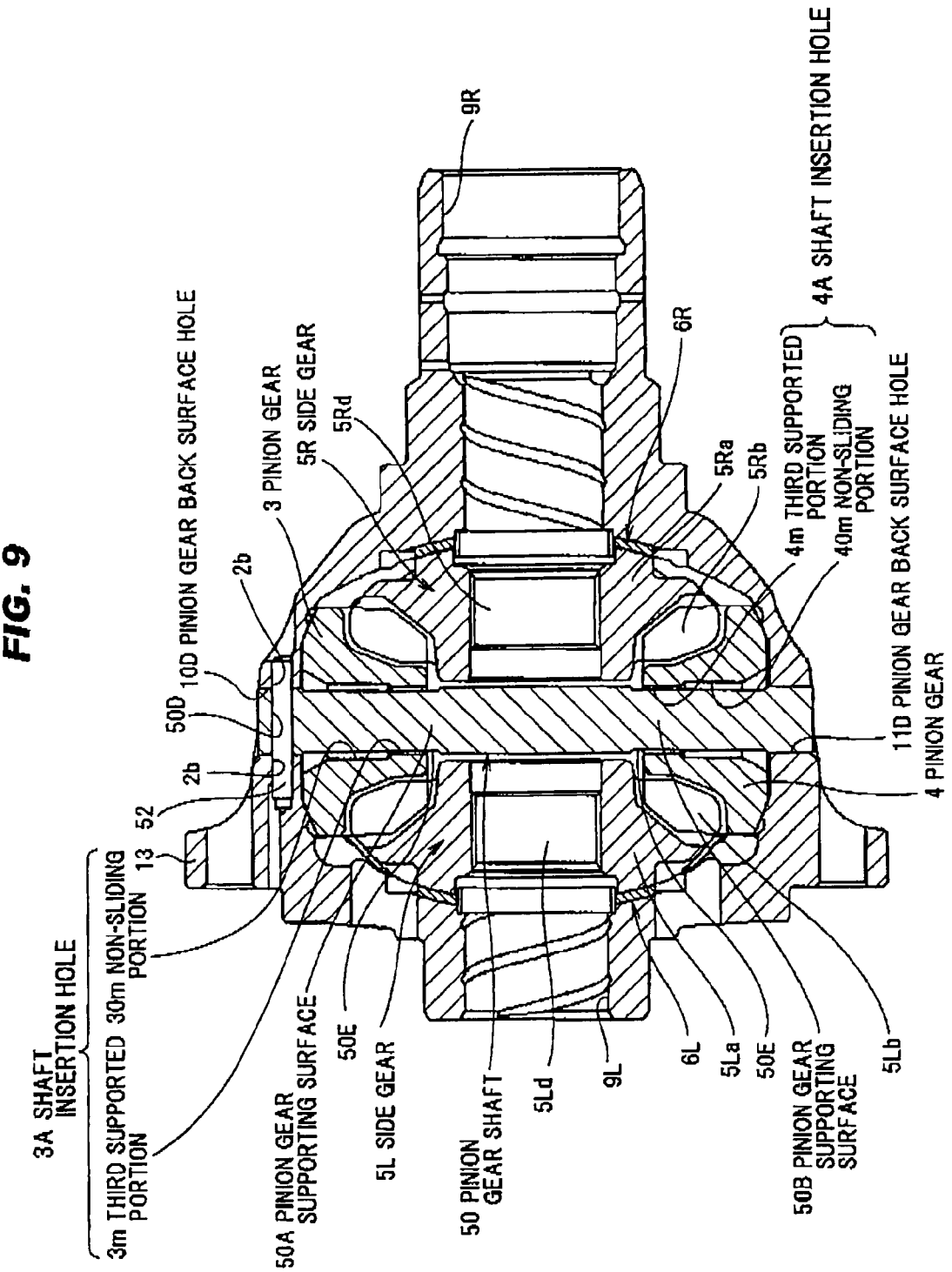
FIG. 9 is a cross sectional view showing an assembled pinion gear of a differential for a vehicle according to a second embodiment of the invention in a state of being cut in parallel with an axis line of rotation of a differential case.
Figure 10:
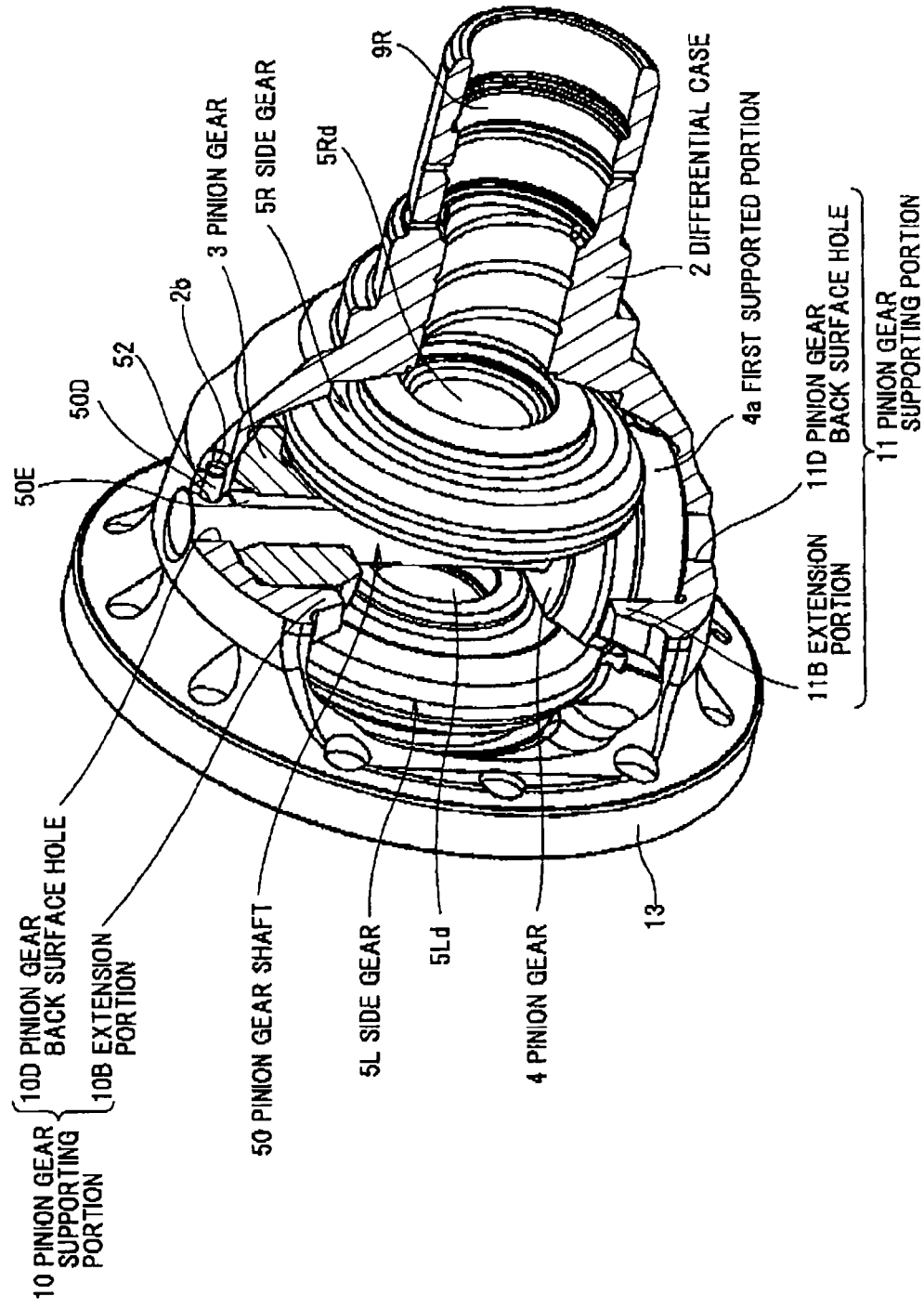
FIG. 10 is a perspective view, parts of a differential case and the pinion gear being partially broken away for explanation of the differential for a vehicle according to the second embodiment of the invention.

FIG. 9 is a cross sectional view showing an assembled pinion gear of a differential for a vehicle according to a second embodiment of the invention in a state of being cut in parallel with an axis line of rotation of a differential case. Also, FIG. 10 is a perspective view, parts of a differential case and the pinion gear being broken away for explanation of the differential for a vehicle according to the second embodiment of the invention. In FIGS. 9 and 10, the same or corresponding members as those shown in FIGS. 1 to 7 are designated with the same reference numerals and reference symbols, respectively, and a detailed description thereof is omitted here for the sake of simplicity.

As shown in FIGS. 9 and 10, in the differential for a vehicle according to the second embodiment of the invention, the pinion gear shaft 50 has no bulge portion, and thus is formed in the form of a columnar body having a major diameter which is set as an approximately uniform size. The pinion gear shaft 50 is provided with a pin insertion hole 50D which radially opens. A pair of notch recess portions 50E and 50E which open along the axis line, O, of rotation are respectively provided in portions, in the outer peripheral surface of the both end portions of the pinion gear shaft 50, which face the gear portions 5Lb and 5Rb of the side gears 5L and 5R, respectively. The pair of notch recess portions 50E and 50E in the end portions of the pinion gear shaft 50 are respectively disposed in positions which are located in parallel with each other at equal intervals (of 180°) in the circumferential direction. In addition, the size, in the direction of the axis line, of each of the pair of notch recess portions 50E and 50E is set as being larger than that, in the direction of the axis line, of each of the shaft insertion holes 3A and 4A. As a result, an oil path is defined between the outer peripheral surface of the pinion gear shaft 50 and each of the inner peripheral surfaces of the shaft insertion holes 3A and 4A (between the outer peripheral surface of the pinion gear shaft 50, and each of the third supported portions 3m and 4m of the shaft insertion holes 3A and 4A, and between the outer peripheral surface of the pinion gear shaft 50, and each of the non-sliding portions 30m and 40m of the shaft insertion holes 3A and 4A). Thus, the outer peripheral surface of the pinion gear shaft 50, and the inner peripheral surfaces of the pinion gears 3 and 4 are lubricated.

In the differential case 2, the minor diameter of each of the pinion gear back surface holes 10D and 11D is set as being approximately equal to the major diameter of the pinion gear shaft 50. As a result, the outer peripheral surface of the pinion gear shaft 50 and the inner peripheral surfaces of the pinion gear back surface holes 10D and 11D are brought into contact with each other, thereby regulating the radial operation of the pinion gear shaft 50. The differential case 2 is provided with pin attaching holes 2b and 2b which open along the axis line, O, of rotation in the inner peripheral surface of the pinion gear back surface hole 10D and which is disposed in parallel with each other at equal intervals (of 180°) in the circumferential direction. Both end portions of a pin 52 which is inserted through the pinion insertion hole 50D of the pinion gear shaft 50 are fixed to the pin attaching holes 2b and 2b, respectively. As a result, the pinion gear shaft 50 is supported by the differential case 2 through the pin 52. Also, the rotation of the pinion gear shaft 50 around its axis is stopped, and the pinion gear shaft 50 is axially retained.

According to the second embodiment described above of the invention, the following effects are obtained in addition to the effects of the first embodiment.

Since the rotation of the pinion gear shaft 50 is stopped by the differential case 2, the rotating speeds of the pinion gears 3 and 4 with respect to the pinion gear shaft 50 agree with each other. As a result, the differential limit force is stabilized because the frictional resistances due to the sliding of the third supported portions 3m and 4m of the pinion gears 3 and 4.

Figure 11:
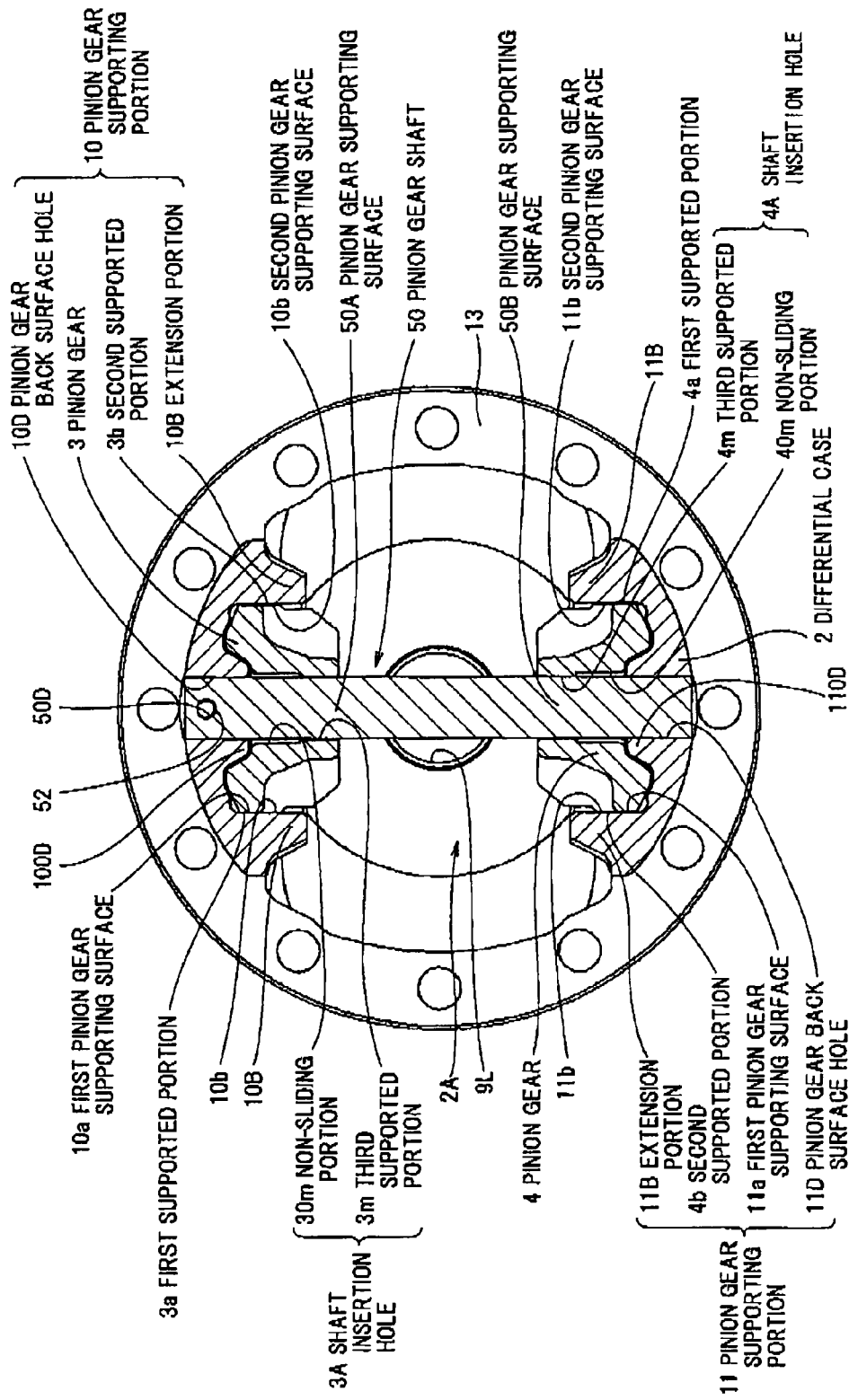
FIG. 11 is a cross sectional view explaining a change of the differential case in the differential for a vehicle according to the second embodiment of the invention.

It is noted that although in this embodiment, the description has been given so far with respect to the case where the inner peripheral surface of the differential case 2 corresponding to the back surface sides of the fourth supported portions 3B and 4B of the pinion gears 3 and 4 is formed in the form of an approximately flat surface, and the pinion gear shaft 50 is supported by the inner peripheral surfaces of the pinion gear back surface holes 10D and 11D provided in the flatly formed portion, the invention is not limited thereto. That is to say, as shown in FIG. 11, annular shaft supporting portions 100D and 110D may be provided in which the inner surface of the differential case 2 corresponding to the back surface sides of the pinion gears 3 and 4 is formed so as to protrude inward along the pinion gear shaft 50, and the pinion gear shaft 50 may be supported by the annular shaft supporting portions 100D and 110D. In this case, a supporting structure having high rigidity is obtained as a supporting structure for the pinion gear shaft 50. In addition, the surface pressure generated between the pinion gear shaft 50 and each of the shaft supporting portions 100D and 110D can be reduced as compared with the case where the pinion gear shaft 50 is supported by the pinion gear back surface holes 10D and 11D.

In addition, although in this embodiment, the description has been given so far with respect to the case where the rotation of the pinion gear shaft 50 is stopped by the pin 52, the invention is not limited thereto. That is to say, for example, the pinion gear shaft 50 may be press-filled into or welded to the hole portion formed in the differential case 2, thereby stopping the rotation of the pinion gear shaft 50. In addition, a part of the pinion gear shaft 50 may be cut out, and a part of the differential case 2 may be engaged with the resulting notch, thereby stopping the rotation of the pinion gear shaft 50.

Third Embodiment

Figure 12:
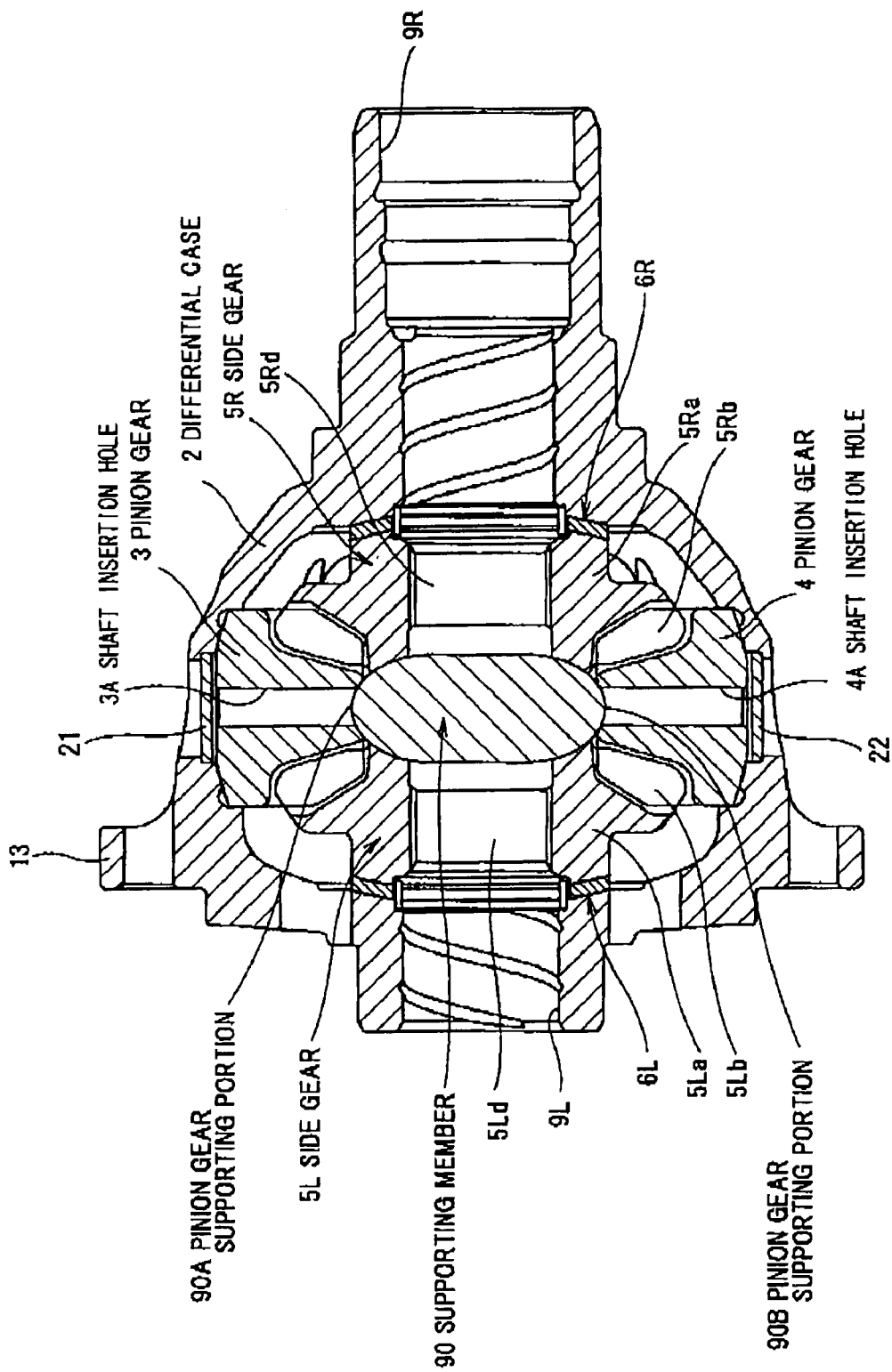
FIG. 12 is a cross sectional view showing an assembled pinion gear of a differential for a vehicle according to a third embodiment of the invention in a state of being cut in parallel with an axis line of rotation of a differential case.

FIG. 12 is a cross sectional view showing an assembled pinion gear of a differential for a vehicle according to a third embodiment of the invention in a state of being cut in parallel with an axis line of rotation of a differential case. In FIG. 12, the same or corresponding members as those shown in FIGS. 1 to 7 are designated with the same reference numerals and reference symbols, respectively, and a detailed description thereof is omitted here for the sake of simplicity.

As shown in FIG. 12, a differential for a vehicle of this embodiment includes a supporting member 90 having pinion gear supporting portions 90A and 90B, as a second pinion gear supporting member, which are brought into contact with gear head side opening inner surfaces of the through holes (hole portions) 3A and 4A of the pinion gears 3 and 4 to rotatably support the pinion gears 3 and 4, respectively, instead of including the axle spacer 23 and the pinion gear shaft 50 in the first embodiment. The supporting member 90 is interposed between the side gears 5L and 5R, and between the pinion gears 3 and 4. Also, the supporting member 90 is disposed in a position where at least parts of the pinion gear supporting portions 90A and 90B are inserted into the through holes 3A and 4A, respectively, to regulate the movements of the pinion gears 3 and 4 to the side of the axis line, O, of rotation.

With the construction described above, the motions of the pinion gears 3 and 4 to the side of approaching the axis line, O, of rotation is regulated, and the inclination of the central axis lines of the pinion gears 3 and 4 with respect to the central axis lines of the inner peripheral surfaces of the pinion gear supporting portions 10 and 11 is regulated.

Note that, the assembly of the differential for a vehicle according to this embodiment of the invention can be carried out as follows. Firstly, the pinion gears 3 and 4 are fitted into the pinion gear supporting portions 10 and 11, respectively. Next, the supporting member 90 is disposed between both the pinion gears 3 and 4. After that, the side gears 5L and 5R are built thereinto, and the thrust washers 6L and 6R are interposed between the side gears 5L and 5R, and the differential case 2.

According to the third embodiment of the invention, the effect that the number of parts and the number of assembly processes can be reduced is obtained in addition to the effects of the first embodiment.

Fourth Embodiment

Figure 13A:
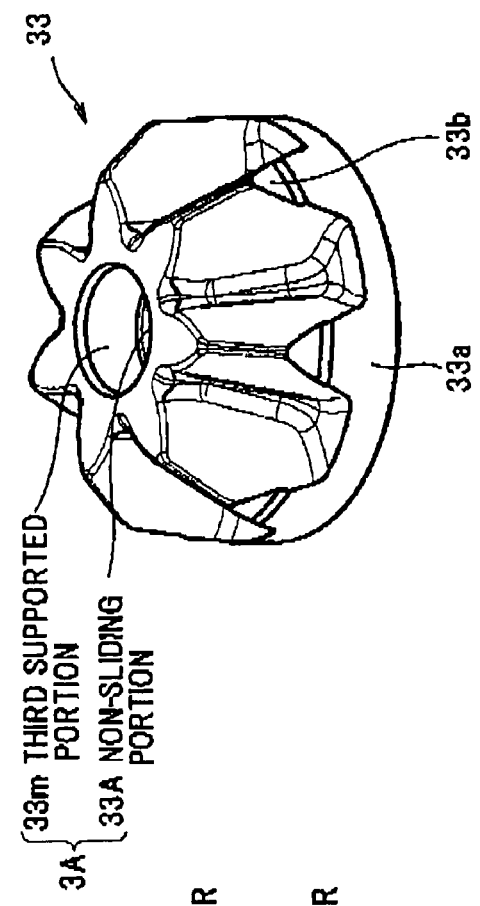
FIGS. 13A and 13B are respectively perspective views showing a pinion gear of a differential for a vehicle according to a fourth embodiment of the invention.
Figure 13B:
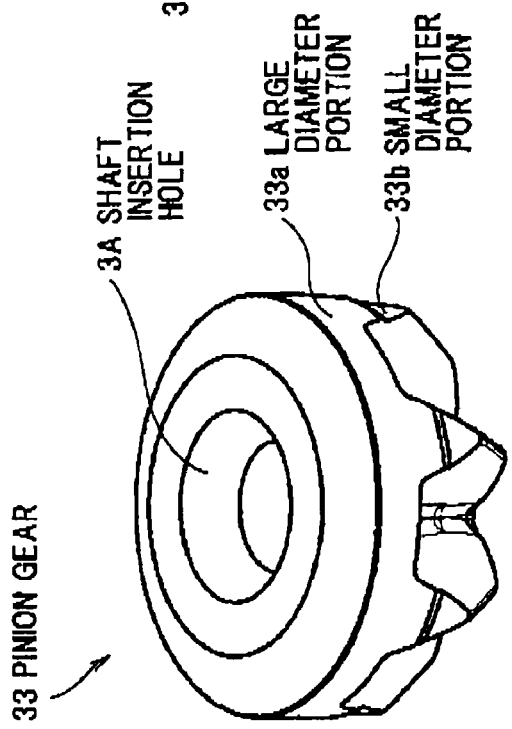
Figure 14:
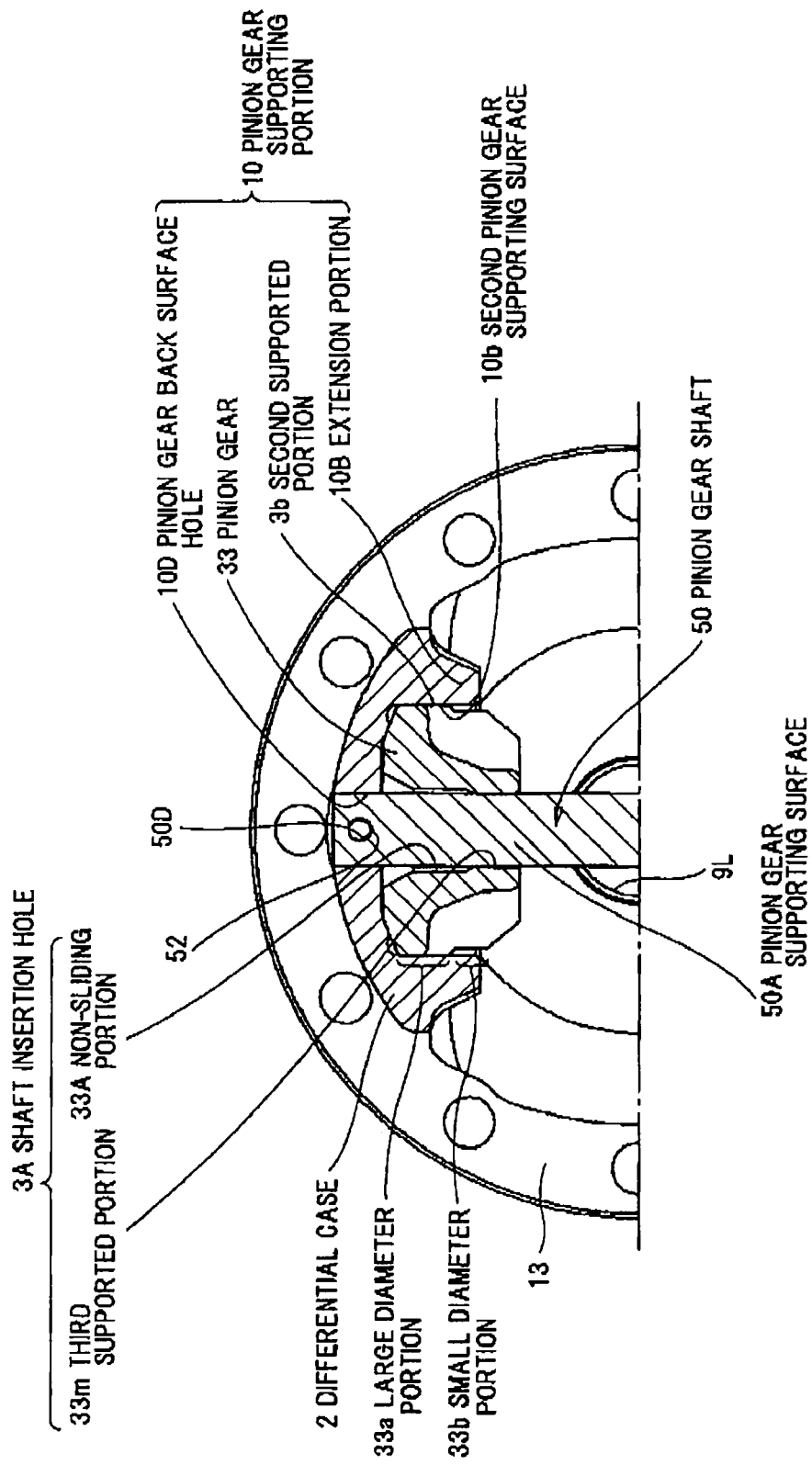
FIG. 14 is a cross sectional view showing a state in which the pinion gear of the differential for a vehicle according to the fourth embodiment of the invention is suppressed by a pinion gear supporting portion.
Figure 15:
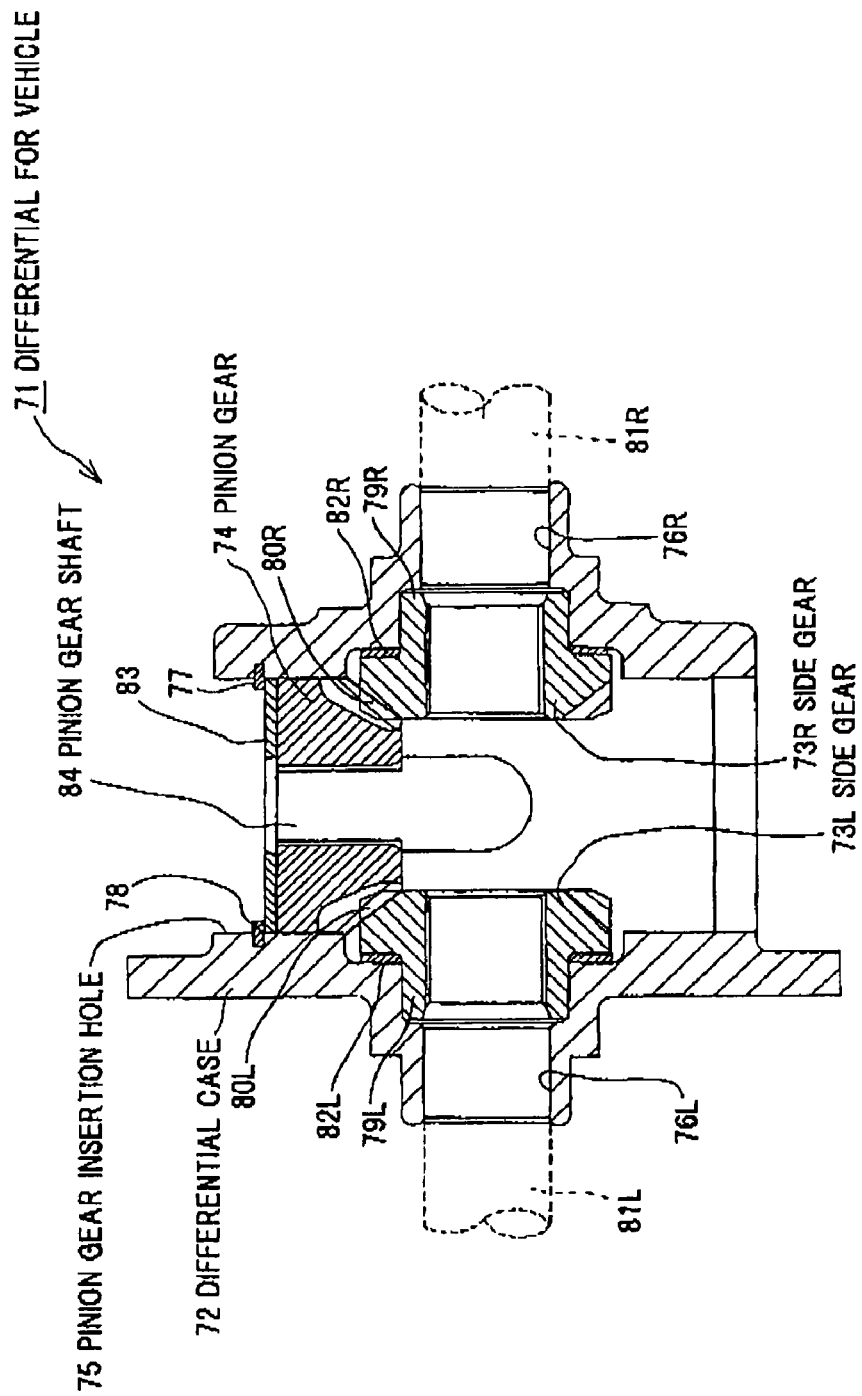
FIG. 15 is a cross sectional view explaining a conventional differential for a vehicle.

FIGS. 13A and 13B are respectively perspective views showing a pinion gear of a differential for a vehicle according to a fourth embodiment of the invention. Here, FIG. 13A shows a state in which the pinion gear is viewed from the upside, and FIG. 13B shows a state in which the pinion gear is viewed from the downside. FIG. 14 is a cross sectional view showing a state in which the pinion gear of the differential for a vehicle according to the fourth embodiment of the invention is suppressed by a pinion gear supporting portion. In FIGS. 13A and 13B, and FIG. 14, the same or corresponding members as those shown in FIGS. 1 to 7 are designated with the same reference numerals and reference symbols, respectively, and a detailed description thereof is omitted here for the sake of simplicity.

The differential for a vehicle of this embodiment is different from that of the first embodiment in that an upper outer peripheral surface of a pinion gear 33 is composed of a large diameter portion 33a which frictionally slides on the second pinion gear supporting surface 10b to be located on the gear base side, and a small diameter portion 33b which is formed to have a diameter smaller than that of the large diameter portion 33a, and is located on the gear head side. As a result, in the differential for a vehicle of this embodiment, only the large diameter portion 33a of the outer peripheral surface of the pinion gear 33 slides on the second pinion gear supporting surface 10b. The large diameter portion 33a of the outer peripheral portion of the pinion gear 33 is disposed on the side of the gear base portion with respect to the central point in engagement between the pinion gear 33, and each of the side gears 5L and 5R. A third supported portion 33m of the shaft insertion hole 3A of the pinion gear 33 is disposed on the side of the gear head portion with respect to the central point of the engagement between the pinion gear 33, and each of the side gears 5L and 5R. That is to say, the large diameter portion 33a and the third supported portion 33m are disposed so as to hold the above central point in engagement between the pinion gear 33, and each of the side gears 5L and 5R in the axial direction of the pinion gear 33. It is noted that since the other pinion gear paired with the pinion gear 33 is constructed approximately and identically to the pinion gear 33, a description thereof is omitted here for the sake of simplicity.

According to the fourth embodiment described above of the invention, the large diameter portion 33a and the third supported portion 33m are respectively disposed on the both sides of the central point in engagement between the pinion gear 33, and each of the side gears 5L and 5R so as to be located across that central point in engagement from each other. As a result, a depressing force due to the engagement between the pinion gear 33, and each of the side gears 5L and 5R is distributed between the large diameter portion 33a and the third supported portion 33m in a balanced manner. Also, the distribution ratio hardly changes due to the frictional wear caused by the traveling state of the vehicle, and the long-term use. Consequently, the differential limit force can be obtained in the more stable state.

It is noted that although in this embodiment, the description has been given so far with respect to the case where the large diameter portion 33a and the small diameter portion 33b are formed on the outer peripheral surface of the pinion gear 33, and the pinion gear 33 is rotatably supported by the second pinion gear supporting surface 10b only on the side of the base portion with respect to the central point in engagement, the invention is not limited thereto. That is to say, a construction may also be adopted such that the pinion gear 33 is formed in the form of a columnar body having an outer peripheral surface having a uniform major diameter, and an amount of protrusion of the second pinion gear supporting surface 10b to the axis line, O, of rotation of the differential case 2 is shortened, thereby rotatably supporting the pinion gear 33 only on the side of the gear base portion with respect to the central point in engagement by the second pinion gear supporting surface 10b. In addition, a construction may also be adopted such that a first portion of the second pinion gear supporting surface on the side of the gear base portion with respect to the central point in engagement of the pinion gear 33 is made a small diameter portion having a minor diameter of a, a second portion of the second pinion gear supporting surface located on the side of the gear head portion is made a large diameter portion having a minor diameter of b (b>a), and the large diameter portion is inhibited from being brought into contact with the outer peripheral surface of the pinion gear 33.

Although the differential for a vehicle of the invention has been described so far based on the embodiments described above, the invention is not limited to the embodiments described above, and can be implemented in the form of various illustrative embodiments without departing from the gist of the invention. Thus, for example, a change as will be described below can be made.

Although in the embodiments described above, the description has been given so far with respect to the case where the differential case 2 is formed in the form of one-piece member, the invention is not limited thereto. Thus, it is to be understood that the differential case 2 may also be composed of a plurality of case elements.

What is claimed is:

1. A differential for a vehicle, comprising:
   a differential case rotatable about an axis;
   one pair of side gears rotatably accommodated in the differential case;
   at least one pair of pinion gears engaged at right angles with the one pair of side gears, shaft insertion holes extending along rotation axes of the at least one pair of pinion gears, respectively, wherein the pinion gears each have an outer peripheral surface extending generally parallel to the respective shaft insertion hole therein; and
   a pinion gear shaft inserted through the shaft insertion holes and supported by the differential case;
   wherein the differential case has a first pinion gear supporting portion for directly engaging and rotatably supporting the outer peripheral surfaces of the at least one pair of pinion gears,
   the pinion gear shaft has a second pinion gear supporting portion for rotatably supporting the at least one pair of pinion gears by sliding on inner surfaces of the shaft insertion holes, and
   the second pinion gear supporting portion is disposed closer to the axis of rotation of the differential case than is the first pinion gear supporting portion.

2. The differential for a vehicle according to claim 1, wherein the pinion gear shaft is supported by the differential case so as to be non-rotatable around an axis of the pinion gear shaft.

3. A differential for a vehicle, comprising:
   a differential case rotatable about an axis;
   one pair of side gears rotatably accommodated in the differential case;
   at least one pair of pinion gears engaged at right angles with the one pair of side gears, shaft insertion holes extending along rotation axes of the at least one pair of pinion gears, respectively, wherein the pinion gears each have an outer peripheral surface; and
   a pinion gear shaft inserted through the shaft insertion holes and supported by the differential case;
   wherein the differential case has a first pinion gear supporting portion for rotatably supporting the outer peripheral surfaces of the at least one pair of pinion gears,
   the pinion gear shaft has a second pinion gear supporting portion for rotatably supporting the at least one pair of pinion gears by sliding on inner surfaces of the shaft insertion holes,
   wherein the shaft insertion holes of the at least one pair of pinion gears comprises a stepped hole having two inner surfaces different in inner diameter from each other, and only the inner surface having a smaller inner diameter slides on the second pinion gear supporting portion,
   wherein the majority of the first pinion gear supporting portion is located farther from the axis of rotation of the differential case, in an axial direction of the pinion gear shaft, than is a central point of engagement between the at least one pair of pinion gears and the one pair of side gears; and
   wherein the majority of the inner surface having the smaller inner diameter is located closer to the axis of rotation of the differential case, in the axial direction of the pinion gear shaft, than is the central point of engagement between the at least one pair of pinion gears and the one pair of side gears.

4. The differential for a vehicle according to claim 3, wherein the first pinion gear supporting portion and the second pinion gear supporting portion are disposed at a predetermined distance from each other.

5. The differential for a vehicle according to claim 4, wherein
   the first pinion gear supporting portion rotatably supports the outer peripheral surfaces of the at least one pair of pinion gears at a location closer to a gear base portion than is the central point of engagement between the at least one pair of pinion gears and the one pair of side gears; and
   the second pinion gear supporting portion rotatably supports the at least one pair of pinion gears at a location closer to a gear head portion than is the central point of engagement between the at least one pair of pinion gears and the one pair of side gears.

6. The differential for a vehicle according to claim 5, wherein each of the outer peripheral portions of the at least one pair of pinion gears comprises a large diameter portion which is located closer to the gear base portion than is the central point of engagement, and a small diameter portion which has an outer diameter smaller than that of the large diameter portion and which is located closer to the gear head portion than is the central point of engagement, and the large diameter portion are supported by the first pinion gear supporting portion.

* * * * *